Jan. 6, 1970  W. W. LEE ET AL  3,487,942
FILTER UNIT

Filed Aug. 22, 1968  2 Sheets-Sheet 1

INVENTORS.
WILBUR W. LEE
GARTH O. BLANCHARD
BY Jack M. Wiseman
ATTORNEY

INVENTORS.
WILBUR W. LEE
GARTH O. BLANCHARD
BY Jack M. Wiseman
ATTORNEY

# United States Patent Office 3,487,942
Patented Jan. 6, 1970

3,487,942
FILTER UNIT
Wilbur W. Lee, Orinda, and Garth O. Blanchard, Walnut Creek, Calif., assignors to Motor Filter Manufacturing Company, doing business as Motor Guard Corporation, San Leandro, Calif., a corporation of California
Filed Aug. 22, 1968, Ser. No. 754,679
Int. Cl. B01d 27/08
U.S. Cl. 210—439                           14 Claims

ABSTRACT OF THE DISCLOSURE

A filter unit wherein a roll of absorbing material such as, but not restricted to, toilet tissue is insertable within a suitable filter housing to serve as an oil filter in the lubrication system of an internal combustion engine. The filter housing comprises two separable sections that are in sealing juncture with one another during the filtering operation. Oil to be filtered enters the filter unit to pass axially through the roll of tissue, and, upon leaving the roll of tissue, the oil is directed toward an outlet by a plurality of parallel rib members provided in the upper portion of the filter housing and engageable with the roll of tissue. The parallel rib members direct the oil from the roll of tissue toward an annular channel and then to an outlet of the filter unit. Provision is also made to maintain the annular channel in open condition by the interposition of an annular member between the roll of tissue and the annular channel.

BACKGROUND OF THE INVENTION

Prior art patents relating to the use of a roll of toilet tissue in a filter unit include the patents to Dummler Nos. 3,317,045 and 3,317,053. The use of toilet tissue rolls in filters is also shown in the patent to Lash No. 2,661,846 and the patent to Frantz No. 2,738,879.

However, various problems have been encountered in the use of these tissue rolls in an oil filter. The cost advantage of a roll of tissue as compared with many filter cartridges on the market is obviously quite great, but several deficiencies have been noted. Firstly, there has been some difficulty both in the appropriate insertion and subsequent removal of the roll of paper, and, secondly, when the roll is not precisely inserted, channels are formed enabling some or all of the oil to actually bypass the paper filtering medium itself. The structure described in the aforementioned Dummler patents are directed to these problems.

Further improvements have been found to be necessary to assure the flow of oil through the filter element without any impeding of the flow by incorrect positioning of the roll of tissue, or plugging of oil passages that might occur in the event that tissue is softened by absorbed moisture and is forced into the passages by the oil pressure. By improving the flow of oil through the filter, oil pressures are kept at a reasonable limit without impairing the operation of the filter and the overall effectiveness of the filter is improved. By assuring an optimum flow of oil through the filter, the effective life of the element is significantly extended and the overall efficiency of the filter is improved.

SUMMARY OF THE INVENTION

The present invention relates in general to filter units arranged for the continuous filtration of oil such as may be circulated in an internal combustion engine lubricating system; and more particularly to oil filters employing a roll of tissue paper as the filtering element.

In normal operation, it is well known that lubricating oils for internal combustion engines become contaminated with impurities such as moisture, dirt, carbon, and unburned fuel resins, which reduce the lubricating properties of the oil. To remove the impurities, it is established practice to filter the oil in the oil circulation system of an internal combustion engine. Such filters, for expediency and efficiency, ordinarily have replaceable elements contained within a housing or are self-contained so that they can be readily removed and replaced.

To provide an inexpensive filter medium for insertion in the filter housing, a roll of ordinary toilet tissue can be used as a filter element. However, consideration must be given to the construction of the interior of the housing so that the roll of tissue can be inserted and located properly inside the housing for the most effective filtering action without unnecessarily restricting the flow of oil through the filter.

It is therefore an object of the invention to provide an improved housing for a filter medium to effectively filter the oil flowing through the housing and filter element.

It is another object of the invention to provide a filter unit including detachable sections wherein one of said sections has a portion for directing the oil from the filter medium to the outlet passage, and wherein protective means is provided to prevent the filter medium from obstructing the flow of oil to the outlet of the filter unit.

These as well as other objects and features of the invention will become apparent from the following description shown in the accompanying drawings.

DESCRIPTION OF THE PREFERRED EMBODIMENT

Figure 1:
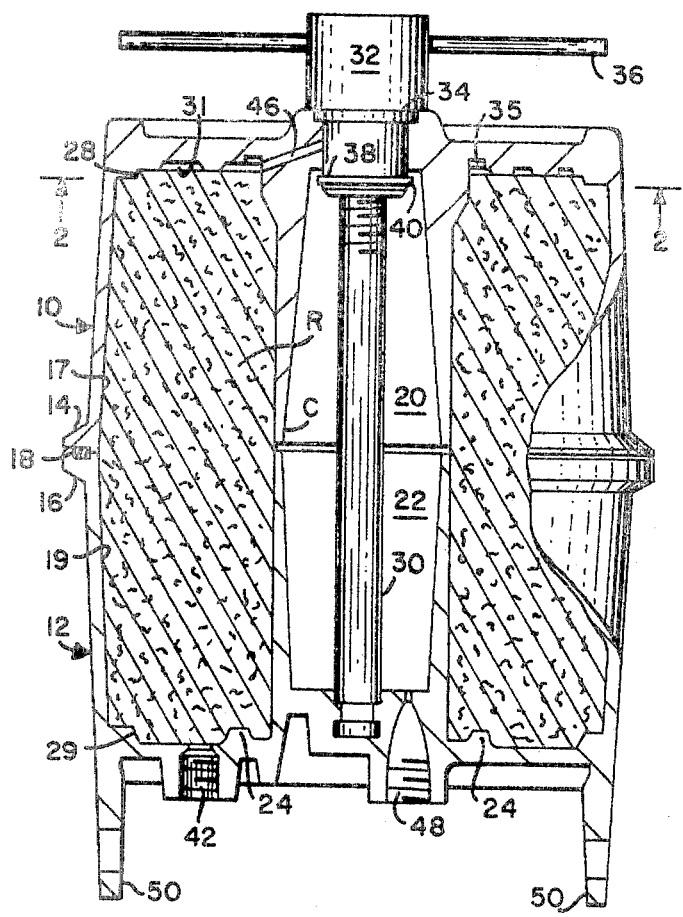
FIGURE 1 is a side elevational view of a filter unit constituting one embodiment of the invention with a portion of the structure being broken away and shown in longitudinal section to illustrate interior details thereof.

With initial reference to FIG. 1, the first embodiment of the invention includes a housing whose overall dimensions are such as to closely encompass a standard roll of toilet tissue. More particularly, such housing includes two separable cup-shaped sections 10 and 12 of approximately equivalent dimensions. At their lips, both cups are provided with mating flanges 14 and 16, the flange 16 on the lower cup having a circular groove in its upper surface to receive a standard rubber O-ring 18 so that upon application of axial pressure, the cup juncture is effectively sealed. When so joined, the axial length of the housing is preferably slightly less than the length of the paper roll R, which, of course, is inserted while the sections 10 and 12 are separated. To facilitate the insertion of a roll R into the cup-shaped sections 10 and 12, the walls are slightly tapered as indicated at 17 and 19.

Concentrically within both cup sections 10 and 12 similar integral tubular members 20 and 22 project from the bases of the cup-shaped sections to project inwardly and terminate at a position that when the exterior cup flanges 14 and 16 are joined, the extremities of the tubular members are adjacent but not quite touching. Such tubular members 20 and 22 are dimensioned to receive telescopically thereover the cardboard core C of a conventional roll R of toilet tissue thereon and preclude collapse of the core C when oil pressure is experienced.

To insure radial seating engagement between the described cup-shaped sections 10, 12 and a roll R of toilet tissue inserted therewithin, the bottom portion of the lower cup-shaped section 12 is provided with an annular flange 24. Consequently, axial pressure exerted on the roll R and its core C will force a substantial portion of the lower end thereof between the annular flange 24 and the tapered wall 19. Small rectangular steps 28 and 29 are also formed in both cup-shaped sections 10 and 12 at the juncture of the side wall and base. Also, groups A–D of parallel rib members 31 are disposed against the base between the step 28 and directed toward the tubular member 20. In order to releaseably secure the cup-shaped sections 10 and 12 in sealed enclosure of a roll R of toilet tissue, a stud 30 is integrally secured to the center of the lower cup-shaped section 12 to project axially upward through the tubular members 20 and 22 of both sections. The upper threaded extremity of such stud 30 is arranged to receive a cap nut 32 which slidably and rotatably extends through an axial opening in the base of the upper cup-shaped section 10. Exterior of the housing, the cap nut 32 is enlarged and carries a gasket 34 arranged to sealingly engage the exterior of the upper cup-shaped section 10 when the cap nut is screwed down onto the stud 30, preferably through utilization of a suitable handle 36. As such cap nut 32 is tightened, it forces the upper cup-shaped section 10 downwardly to compress the O-ring 18 between the flanges 14 and 16 and simultaneously to axially compress the roll R of paper therewithin as will be explained in more detail hereinafter. Interiorly of the upper cup-shaped section 10, the cap nut 32 carries a ring 40 so that when the cap nut 32 is turned to loosen the same on the stud 30, the upper cup-shaped section 10 if forceably separated from the lower cup-shaped section 12 and the compressive force on an enclosed roll R of tissue is removed, leaving the roll in the lower section substantially exposed for grasping and removal.

To provide for ingress of oil into the filter unit, an interiorly threaded inlet opening 42 is provided in the base of the lower cup-shaped section 12. When the cap nut 32 is tightened to effect sealing juncture of the two cup-shaped sections 10 and 12, an axial compression of the roll R of tissue occurs as mentioned, and the tissue is forced against the groups of parallel rib members 31 and over annular flange 24. When oil is delivered through the inlet opening 42 under pressure, it is directed centrally into the roll R of paper and thus exerts further forces in divergent radial directions to press the exterior and interior surfaces of the roll R and core C against the tapered portions 19 of the side wall and interior tubular member 22 of the lower cup-shaped section 12. This action serves effectively to preclude any by-pass of oil exteriorly or interiorly of the filtering medium.

An opening 46 is provided through the upper portion of the upper cup-shaped section 10 adjacent its base so that oil which has passed upwardly through the entire roll R of paper can then pass to the interior of the tubular member 20 and then downwardly through the hollow interiors of both tubular members 20 and 22 to an outlet opening 48 formed at one side of the stud 30 in the base of the lower section 12. Opening 48 is suitably threaded to provide for connection of an oil conduit and also has restricted dimensions to provide requisite control of oil pressure.

Figure 2:
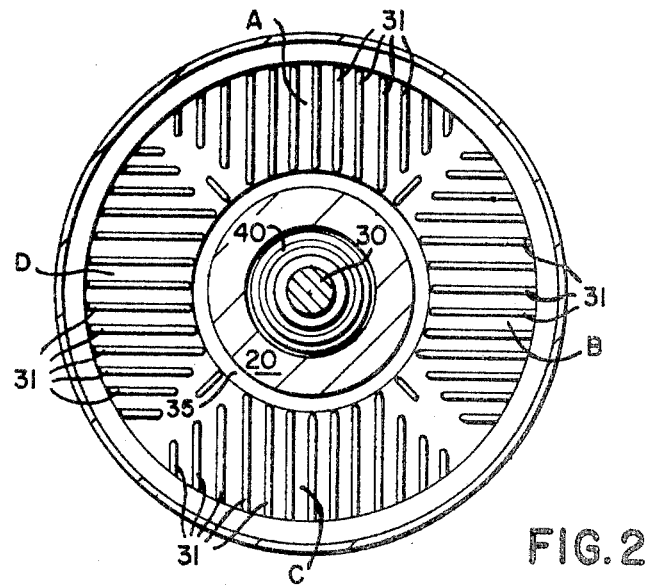
FIGURE 2 is a plan view of the filter unit taken along 2—2 of FIG. 1.

In the upper portion of cup-shaped section 10, a plurality of groups of parallel rib members or flanges 31 form grooves or passageways. The oil flowing upwardly (as viewed in the drawings) through roll R enters into the grooves and is directed by members 31 toward annular channel 35 which connects with opening 46. The preferred pattern formed by the plurality of groups of parallel flanges 31 is shown in FIGURE 2. It is to be observed that the oil is directed toward the annular channel 35 and out through the opening 46. Note that the rib members 31 of each group are substantially parallel and the members are arranged in groups A, B, C and D to direct oil toward the channel 35, and then out the opening 46 to the filter unit and the outlet opening 48. The parallel ribs of group A are directed in the same direction as the parallel ribs of group C. The parallel ribs of group B are directed in the same direction as the parallel ribs of group D. The parallel ribs of group A and C are at right angles with respect to the parallel ribs of groups B and D.

Suitable brackets 50 are provided on the lower cup-shaped section 12 to enable the mounting of the filter unit adjacent an internal combustion engine whose oil is to be filtered thereby and suitable connections to the oil inlet and outlet openings 42 and 48 are then made. A fresh roll R of toilet tissue is placed into the lower cup-shaped section 12 from which the upper cup-shaped section 10 has been previously removed. Ease of placement of the roll of tissue in such position is insured by the taper 19 of the lower cup-shaped section 12. It is not necessary that the roll R of paper be pushed entirely to the bottom of the lower cup-shaped section 12, since final insertion is obtained during completion of assembly of the unit.

After the roll R is positioned in the lower cup-shaped section 12. the upper cup-shaped section 10 is pressed thereover. Again ease of such placement being assured by the taper 17 of the upper cup-shaped section. Manual pressure downwardly on the upper cup-shaped section 10 will readily bring the cap nut 32 into initial engagement with the central stud 30. Thereafter, turning of such cap nut 32 will quickly effect sealing seating of the upper cup-shaped section 10 over the lower cup-shaped section 12. During such tightening, the lower extremity of the roll R of tissue is axially urged toward the base so that engagement of the roll R and core C with the flange 24 and step 27 effects a radial compression thereof. Lowering of the upper cup-shaped section 10 by the turning of the cap nut 32 also effects a radially-inward pressure through the step 26 adjacent the base of the upper cup-shaped section 10 to again effect a radial compression of the roll of toilet tissue at this position. The steps 28 and 29 at the corner of the base and side wall of the cup-shaped sections 10 and 12 serve to crimp the roll R of tissue at these positions to further preclude any possibility of oil by-pass. In summation, all of the oil entering the unit is forced to pass axially through the compressed roll of tissue and then between the rib members 31 into the annular channel 35 to the central tubular members 20, 22 and finally through the outlet 48 for recirculation through the engine.

After a predetermined period of use, the roll R of toilet tissue can be removed easily. More particularly, the cap nut 32 is first loosened which forceably pulls the upper cup-shaped section 10 from its tight position on the roll leaving the roll in the lower section. After the cap nut 32 has become disengaged from the upper end of the threaded stud 30, the upper cup-shaped section 10 can be easily manually lifted so that the entire upper half of the roll R of paper is exposed. The roll R can be readily grasped and removed from its seat within the lower cup-shaped section 12 and a new roll can be immediately be reseated therewithin. The entire process of replacement is rapid, and, once the sections 10 and 12 have been reassembled, a tight compressive fit is assured.

It will be observed that the cup-shaped sections 10 and 12 shown in FIG. 1 are relatively simple structures which can be formed from castings. The fabricated central stud 30 can be cast as an insert within the lower cup-shaped section during the casting process. After the casting is completed, the only steps required are for the inlet and outlet openings 42 and 48, annular channel 35, and opening 46 through the tubular member 20 of the upper cup-shaped section to be machined. Thus, the described design provides for simplicity of fabrication as well as effectiveness of operation.

In FIG. 2, the parallel rib members 31 of section 10 can be seen as arranged in patterns A, B, C, and D to direct the oil flow toward annular channel 35, so that the oil can be discharged through opening 46 to the tubular members 20, 22 to exit at outlet opening 48. Such rib members 31 and the patterns of groups A, B, C, and D of rib members can be readily cast in the section 10.

Figure 3:
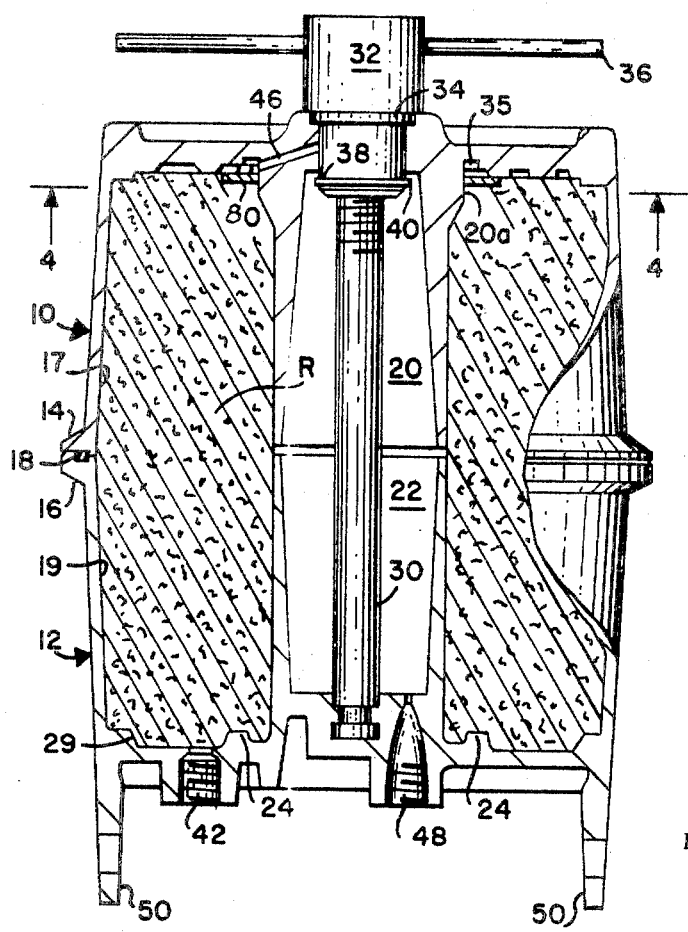
FIGURE 3 is a side elevation view of the filter unit of FIG. 1 constituting a slightly modified embodiment of the invention.

A modification of the invention is illustrated in FIG. 3 and like reference numerals are applied corresponding parts. The cup-shaped sections 10 and 12 are substantially like those described in connection with the first embodiment illustrated in FIG. 1. However, a washer or baffle 80 is secured in press-fit relationship with tubular member 20 at peripheral portion 20a below and in engagement with the upright walls of the channel 35. The washer 80, engageable with the filter element, aids in maintaining the channel 35 in an open condition and serves to prevent any of the tissue paper of the filter elment from being forced upwardly to block the channel 35, thus serving to maintain the optimum flow of oil through the channel 35 to the opening 46.

Figure 4:
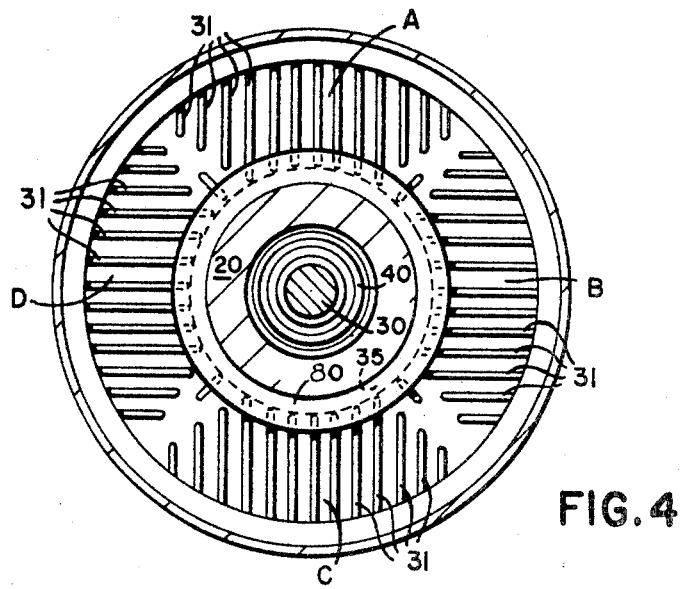
FIGURE 4 is a plan view of the modification filter unit taken along 3—3 of FIG. 3.

In FIG. 4, the rib members 31 of the respective groups A, B, C, and D are disposed in parallel relation for directing the flow of oil to the annual channel 35 for exit through the opening 46. The washer or baffle 80 engages the inner portions of rib members 31 extending toward annular channel 35, thus, in effect, covering channel 35 and protecting it from being blocked or otherwise closed by tissue from the filter element.

What is claimed is:

1. A filter unit comprising a housing for compressibly containing a roll of tissue filter element,
    said housing having a filter element containing portion provided with a fluid inlet,
    said housing also having a fluid discharge portion for receiving discharged fluid from said filter element,
    said filter element containing portion and said fluid discharge portion being interconnected by fluid passage means formed in said housing, and
    said fluid passage means being formed with a plurality of parallel rib members integral with the housing and engageable with said filter element for directing fluid from said filter element to said fluid discharge portion.

2. A filter unit as claimed in claim 1 wherein said fluid passage means includes additional parallel rib members integral with the housing and disposed at an angle relative to said parallel rib members and lying in the same plane and engageable with said filter element for directing fluid from said filter element to said fluid discharge portion.

3. A filter unit as claimed in claim 1 wherein said fluid passage means also includes an annular channel for receiving fluid directed by said rib members, and wherein an opening is provided in said annular channel communicating with said fluid discharge portion of said housing.

4. A filter unit as claimed in claim 3 wherein an annular washer member is interposed between said annular channel and said filter element to prevent said filter element from closing or otherwise impeding flow through said fluid passage means.

5. A filter unit which comprises a generally cylindrical filter element, and a housing disposed in engagement with said filter element, said housing including two separable generally cup-shaped sections arranged for sealing juncture,
    one of said cup-shaped sections being provided with a plurality of parallel rib members integral therewith and engageable with said filter element for directing oil from said filter element to an outlet,
    said one cup-shaped section also being provided with an annular channel for receiving the oil from the parallel rib members, and
    a fluid passage connecting said annular channel to said outlet of the filter unit.

6. A filter unit as claimed in claim 5 wherein said annular channel is protected by an annular washer to prevent a portion of the filter element from entering the annular channel.

7. An oil filter comprising a cylindrical body having two separable sections arranged for sealing juncture,
    a roll of tissue filter element replaceably disposed in the body as a filter element,
    one of said separable sections integral with a plurality of parallel rib members engageable with said filter element for directing flow of fluid from said filter element, and
    fluid passage means for receiving fluid from passageways between said parallel rib members for directing said fluid to an outlet of said oil filter.

8. An oil filter as claimed in claim 7 wherein said fluid passage means includes an annular channel communicating with passageways between said rib members and said filter outlet.

9. An oil filter as claimed in claim 8 and comprising an annular washer interposed between said filter element and said annular channel to prevent said filter element from entering said channel.

10. An oil filter as claimed in claim 9 and comprising a first set of integral parallel rib members and a second set of integral parallel rib members, wherein the parallel rib members direct fluid to said annular channel and to said filter outlet.

11. A filter unit as claimed in claim 2 wherein said additional parallel rib members are normal to said parallel rib members.

12. A filter unit as claimed in claim 4 wherein said washer member is in engagement with said parallel ribs.

13. An oil filter as claimed in claim 10 wherein said first set of parallel rib members is disposed at an angle relative to said second set of rib members.

14. An oil filter as claimed in claim 10 wherein said first set of parallel rib members is normal to said second set of rib members.

References Cited

UNITED STATES PATENTS

| | | | |
|---|---|---|---|
| 2,928,547 | 3/1960 | Lawrence | 210—451 |
| 3,317,053 | 5/1967 | Dummler | 210—439 |

REUBEN FRIEDMAN, Primary Examiner

T. A. GRANGER, Assistant Examiner